(12) United States Patent
Hubner et al.

(10) Patent No.: US 12,408,574 B2
(45) Date of Patent: Sep. 9, 2025

(54) AGRICULTURAL MACHINE ADJUSTING MECHANISM

(71) Applicant: Deere & Company, Moline, IL (US)

(72) Inventors: Cary S. Hubner, Geneseo, IL (US); Gaurav Chakraborty, Uttarpara (IN); Matt D. Bartelson, Bettendorf, IA (US)

(73) Assignee: Deere & Company, Moline, IL (US)

( * ) Notice: Subject to any disclaimer, the term of this patent is extended or adjusted under 35 U.S.C. 154(b) by 732 days.

(21) Appl. No.: 17/242,832

(22) Filed: Apr. 28, 2021

(65) Prior Publication Data

US 2022/0346299 A1 Nov. 3, 2022

(51) Int. Cl.
*A01B 61/04* (2006.01)
*A01C 5/06* (2006.01)
*A01C 7/20* (2006.01)

(52) U.S. Cl.
CPC .......... *A01B 61/046* (2013.01); *A01C 5/066* (2013.01); *A01C 5/068* (2013.01); *A01C 7/205* (2013.01)

(58) Field of Classification Search
CPC ....... A01B 61/046; A01C 5/066; A01C 5/068; A01C 7/205
USPC ...................................................... 172/264
See application file for complete search history.

(56) References Cited

U.S. PATENT DOCUMENTS

| 223,501 A | * | 1/1880 | Green | A01C 5/068 172/551 |
| 753,452 A | * | 3/1904 | Van Brunt | A01B 39/18 172/500 |
| 778,123 A | * | 12/1904 | Fetzer | A01C 5/068 172/566 |
| 945,098 A | * | 1/1910 | Kearin | A01B 39/18 172/500 |

(Continued)

FOREIGN PATENT DOCUMENTS

| DE | 9010178 U1 | 11/1991 |
| EP | 3698616 A1 | 8/2020 |

OTHER PUBLICATIONS

Extended European Search Report and Written Opinion issued in European Patent Application No. 22166683.7, dated Sep. 16, 2022, in 08 pages.

*Primary Examiner* — Christopher J Sebesta
*Assistant Examiner* — Joel F. Mitchell
(74) *Attorney, Agent, or Firm* — Taft Stettinius & Hollister LLP; Stephen F. Rost

(57) ABSTRACT

Agricultural machines and implements have a need to adapt to changing environments. A closing system for an agricultural machine has a need to adapt to changing ground surface. The closing system includes a closing device pivotably connected to the agricultural machine, a passive mechanical element that is operable to apply an initial amount of force to the closing device, and an actuator that is operable to apply an actuator force to the passive mechanical element to increase the amount of force that the passive (Continued)

mechanical element applies to the closing device. The actuator can be a linear actuator having an adjustable stroke length to vary the amount of actuator force applied to the passive mechanical element. The passive mechanical element is operable to absorb a shock force as the closing device traverses a ground surface. The passive mechanical element includes one or more springs adjacent the actuator.

19 Claims, 7 Drawing Sheets

(56) References Cited

U.S. PATENT DOCUMENTS

| | | | | |
|---|---|---|---|---|
| 2,760,772 A * | 8/1956 | McIntyre | ............... | A01C 5/068 |
| | | | | 172/705 |
| 2,944,613 A * | 7/1960 | Anderson | ............ | A01B 61/046 |
| | | | | 172/708 |
| 3,760,882 A * | 9/1973 | Geurts | ................ | A01B 61/042 |
| | | | | 172/260.5 |
| 4,293,043 A * | 10/1981 | Neukom et al. | ...... | A01B 61/046 |
| | | | | 172/720 |
| 4,596,199 A * | 6/1986 | Dietrich et al. | ........ | A01C 5/068 |
| | | | | 111/192 |
| 5,431,232 A * | 7/1995 | Kirsch | ................. | A01B 49/027 |
| | | | | 172/438 |
| 5,497,717 A | 3/1996 | Martin | | |
| 5,896,932 A | 4/1999 | Bruns et al. | | |
| 5,906,166 A * | 5/1999 | Wagner | ................. | A01C 7/205 |
| | | | | 172/538 |
| 6,237,696 B1 * | 5/2001 | Mayerle | ................. | A01B 63/26 |
| | | | | 172/558 |
| 6,530,334 B2 | 3/2003 | Hagny | | |
| 7,975,629 B1 | 7/2011 | Martin | | |
| 8,985,234 B2 * | 3/2015 | Gadzella et al. | .... | A01B 63/008 |
| | | | | 172/705 |
| 9,351,438 B2 * | 5/2016 | Whalen et al. | ........ | A01C 5/066 |
| 9,706,703 B2 * | 7/2017 | Anderson et al. | ..... | A01C 7/205 |
| 9,930,822 B2 | 4/2018 | Hagny et al. | | |
| 10,064,324 B2 * | 9/2018 | Gervais et al. | ........ | A01C 5/064 |
| 10,251,326 B2 * | 4/2019 | Andrews | ............... | A01B 35/28 |
| 2015/0096481 A1 | 4/2015 | Glendenning | | |
| 2015/0107862 A1 | 4/2015 | Freed | | |

* cited by examiner

AGRICULTURAL MACHINE ADJUSTING MECHANISM

FIELD OF THE DISCLOSURE

The present disclosure relates to an agricultural machine, such as a row planter having an adjustable closing system, and more particularly, to apparatus, systems, and methods for overcoming shock loading forces while the closing system follows a ground surface contour that includes a flat surface, undulations, rocks, and/or hills.

BACKGROUND OF THE DISCLOSURE

Work machines, such as those in the agricultural, construction, and forestry industries perform a variety of operations. These work machines and implements have a need to adapt to changing environments. In some instances, work machines are row crop planters having row units configured to distribute a commodity to the soil and thereafter close the soil with the commodity therein. Typically row units include blades that form a trench area and a closing system that closes the trench area after the commodity has been distributed therein.

These work machines traverse uneven terrain that can include immovable objects, rocks, and holes which can cause a shock load or force on the closing system as the closing system traverses these elements. Moreover, soil properties can vary over a desired planting area that contains the uneven terrain. As the work machine traverses the desired planting area, the change in soil properties affects adequate and proper closure of the trench area with the commodity therein and presents a need to change how the trench area is closed and/or compacted. Some soil conditions and properties include type, texture, structure, porosity, chemistry, color, air content, that may affect the amount of force that the closing system needs to apply to the soil to properly close the trench area. For example, it is not desirable to compact the soil too tightly such that the seed has trouble growing through the compacted soil. It is also not desirable to have inadequate force on the trench area otherwise there will not be good commodity to soil contact.

Various closing systems for row crop planters can include automatic or manual adjustability to account for the changes in terrain and/or soil properties. Some closing systems that are adjustable rely on hydraulics and pneumatics, adjustment of motor speeds, adjustable air pressure from an air bag, spring system, or other techniques to adjust the amount of force on closing wheels of the row crop planter. A spring system is often used with the closing system wherein a spring is attached to a handle that is used to adjust or change the tension in the spring from a light force to a heavy or high amount of force on the closing wheels. However, this spring system does not adjust for the type of soil until the operator manually adjusts the tension setting for the spring. Other closing systems use different types of closing wheels such as wheels that flat roll the trench area, notched wheels, and/or wheels that are V-shaped. These wheels once attached to a row crop planter may not adequately account for variations in soil properties and terrain changes which may cause shock loading issues and inadequate contact between the closing wheels and soil due to the shock forces or variations in soil properties.

Such challenges create a need for more effective apparatus, systems, and methods for controlling adjustment of the closing system so that the closing system maintains optimal trench closing, especially while traversing uneven terrain.

SUMMARY

According to one embodiment of the present disclosure, a closing system for a work machine, the closing system comprising: one or more closing devices that are operable to contact a ground surface; a first actuator configured to engage the one or more closing devices, the first actuator configured to absorb a shock force; and a second actuator that is operable to engage the first actuator to increase an amount of force that the first actuator applies to the one or more closing devices.

In a second example, wherein the one or more closing devices include one or more closing wheels.

In a third example, wherein the first actuator includes one or more springs.

In a fourth example, wherein the first actuator is arranged parallel to the second actuator.

In a fifth example, wherein the second actuator is self-locking.

In a sixth example, wherein a stroke length of the second actuator is adjustable to thereby adjust the amount of actuator force applied by the second actuator to the first actuator.

In a seventh example, wherein the second actuator is a linear actuator.

In an eighth example, further comprising: a pivot mechanism that is operably connected to the one or more closing devices and the work machine such that the one or more closing devices rotate about the pivot mechanism.

According to another embodiment of the present disclosure, a closing system for a work machine, the closing system comprising: one or more closing devices that are operable to contact a ground surface; one or more springs that are operable to apply an initial amount of force to the one or more closing devices; and an actuator that is operable to apply an actuator force to the one or more springs to increase the amount of force that the one or more springs apply to the one or more closing devices.

In one example of this embodiment, each of the one or more springs has an initial spring stiffness, wherein application of the actuator force to the one or more springs thereby increases the spring stiffness greater than the initial spring stiffness.

In a second example of this embodiment, wherein a stroke length of the actuator is adjustable to thereby adjust the amount of actuator force applied by the actuator to the one or more springs.

In a third example of this embodiment, each of the one or more springs has one of a progressive spring rate or a constant spring rate.

In a fourth example of this embodiment, the actuator is self-locking to maintain the actuator force on the one or more springs.

In a fifth example of this embodiment, further comprising: an end plate positioned to block extension of the one or more springs beyond the end plate.

In a sixth example of this embodiment, wherein the end plate includes at least one hole sized to receive the actuator therein.

In a seventh example of this embodiment, further comprising: a pivot mechanism that is operably connected to the one or more closing devices and the work machine such that the one or more closing devices rotate about the pivot mechanism.

In an eighth example of this embodiment, wherein the one or more closing devices follow a ground surface while the one or more closing devices rotate about the pivot mechanism.

In a ninth example of this embodiment, wherein the actuator is a linear actuator.

According to yet another embodiment of the present disclosure, a closing system for a work machine, the closing system comprising: one or more closing devices that are pivotably connected to the work machine; a first actuator that is operable to apply an initial amount force to the one or more closing devices; and a second actuator that is operable to apply an actuator force to the first actuator to increase the amount of force that the first actuator applies to the one or more closing devices.

In a first example of yet another embodiment, wherein the second actuator is a linear actuator, and the first actuator is operable to absorb a shock force from the one or more closing devices traversing a ground surface.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
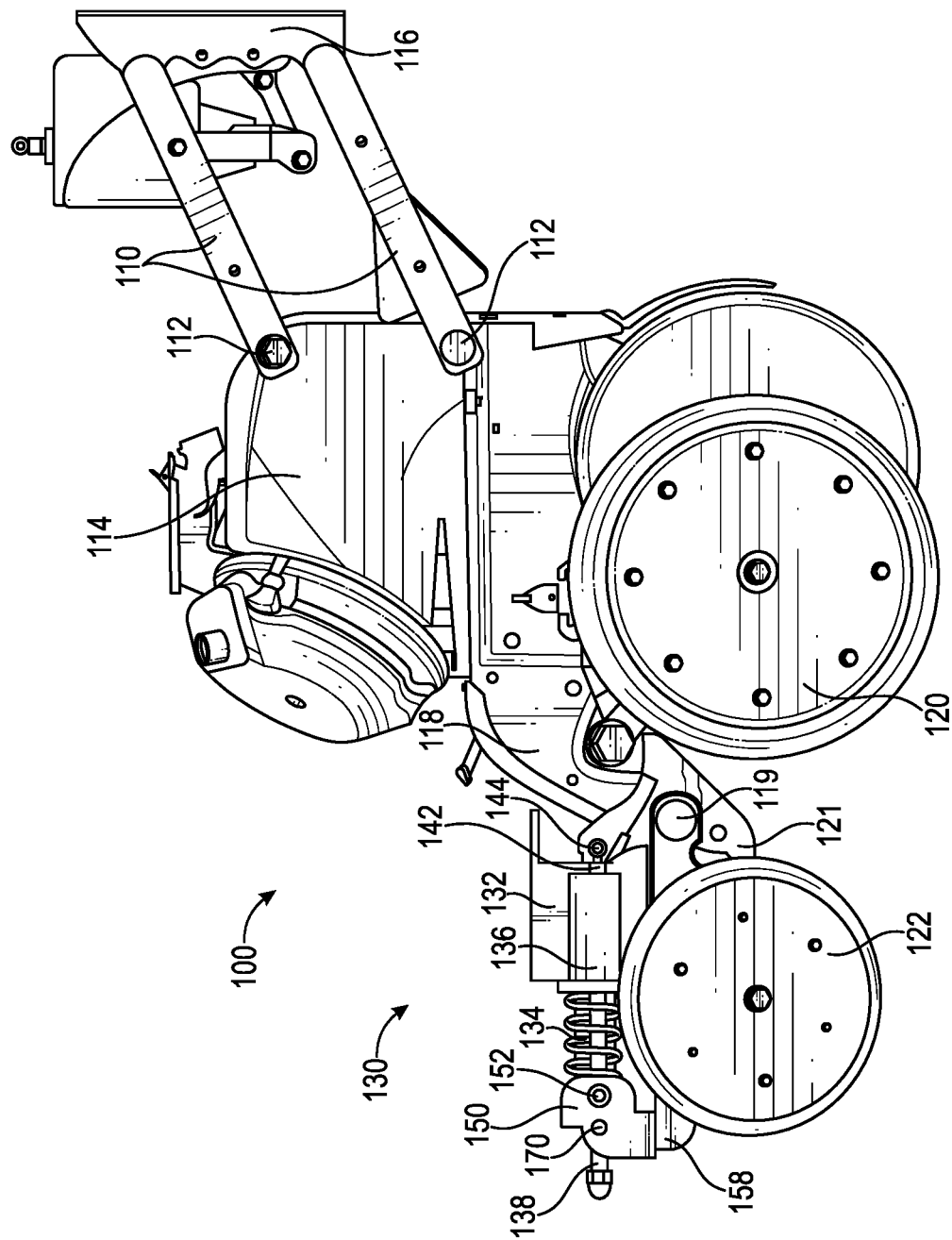
FIG. 1 is a side view of a row unit that is assembled with a work machine (not illustrated)
Figure 2:
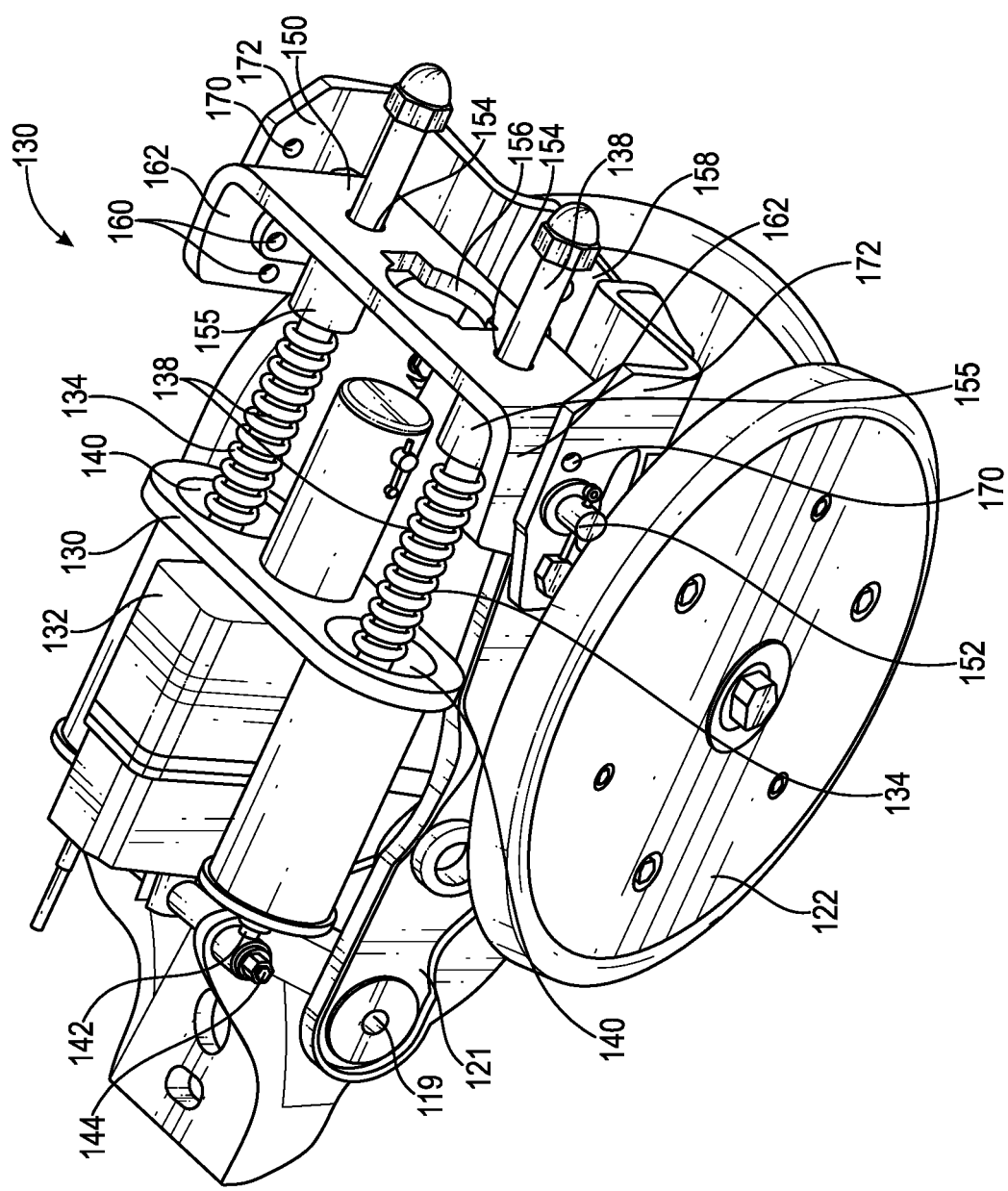
FIG. 2 is a partial top perspective view of the row unit of FIG. 1.

Referring to FIG. 1, an exemplary embodiment of a row unit 100 that is configured for attachment to a rearward end of a work or agricultural machine such as a row crop planter. It is contemplated that a plurality of row units 100 would be attached to the agricultural machine however for ease of illustration only one row unit 100 is illustrated and described.

The row unit 100 includes a pair of linking arms 110 that are pivotally coupled at pivot 112 to a body portion 114. The pair of linking arms 110 extend to a frame portion 116 configured for attachment to the rearward end of the work machine. The row unit 100 includes a shank 118 that extends away from the body portion 114. The shank 118 is pivotally coupled at pivot 119 to a shank extension 121. The row unit 100 includes a pair of gauge wheels 120 rotatably mounted on the body portion 114 and a pair of closing wheels 122 rotatably mounted on the shank extension 121. The row unit 100 includes a closing wheel system 130 operably connected to the shank extension 121, the shank 118, and the pair of closing wheels 122. A row cleaner is not illustrated but could also be mounted to the row unit 100. The pair of gauge wheels 120 are coupled to and moveable vertically relative to the shank 118. The pair of closing wheels 122 are pivotably coupled to the shank extension 121. Although the pair of closing wheels 122 are illustrated in a V-shape configuration, in other forms, the pair of closing wheels 122 can have any shape that is known to close the commodity in a commodity trench.

The row unit 110 is configured to receive commodity, such as seed, from containers on the work machine and deliver the commodity to the soil. Once the commodity is delivered to the soil trench, the soil trench must be closed by the closing wheel system 130 to an optimal compactness to maximize crop yield, and therefore, each closing wheel system 130 should be maintained at a desired closer wheel downforce to close the soil trench in the ground with the commodity therein. Moreover, as the row unit 100 traverses uneven terrain such as rocks, holes, or ground undulations, a shock force or load is applied to the row unit 100, however with an appropriate nominal force setting on the closing wheel system 130, the closing wheel system 130 will overcome the shock force or load and thereby float along the ground undulations and rocks as these terrain features are encountered by the row unit 110.

The closing wheel system 130 is one example however the present disclosure is applicable to other work machines where it is desirable to adjust a force with the ability to float and breakaway with ground undulations and rock strike while traversing a terrain. The closing wheel system 130 is a novel way of combining multiple actuators in series to both follow ground undulations and overcome shock loads to respond while providing a variable nominal force adjustment to the closing wheel system 130. A first one of the actuators is configured to absorb shock or force due to ground undulations, rock strike, or other forces caused while the closing wheel system 130 traverses terrain and a second one of the actuators is configured to adjust or shift the shock absorbance to either increase or decrease an initial or nominal amount of shock absorbance of the first one of the actuators. The actuator that is configured to absorb shock or force from the ground undulations can be adjustable, and can either be active or passive. In one form, the actuator that is configured to absorb shock or force is a passive mechanical device wherein the mechanical device is not operable by electric power. The multiple actuators are combined in series or parallel, and single or multiple sets of the multiple actuators are disclosed for the closing wheel system 130. Some non-limiting examples of actuating devices that can be used for either adjusting a nominal force and/or absorbing shock force include gas shocks or gas springs which can be passive or adjustable. Other non-limiting actuating devices include a compliant material, such as rubber bumpers, bungee straps, which can be passive or adjustable. Other non-limiting actuating devices include a hydraulic actuator which can be active and adjustable, or a hydraulic actuator with an accumulator which can be active, adjustable, or passive (using accumulator). Other non-limiting actuating devices include a pneumatic air spring or shock or bag that can be active if the pneumatic air spring or shock or bag is coupled to an air source or air valve. The pneumatic air spring, shock, or bag is adjustable or can be passive due to the air compression. Some examples of actuating devices include mechanical springs which can include extension, compression, torsion, coil, leaf, and/or Belleville types. Some examples of actuating devices can include general shock absorbers including gas or coil over types. Some examples of actuating devices can include lead screw including passive or back-driveable, or active if powered by a motor. Some examples of actuating devices can include a ball screw that can be self-locking or active if powered. Some examples of actuating devices include memory material, such as spring steel or other material that deforms and returns to its shape when load is released, and can be passive.

The closing wheel system 130 includes a first actuator including a linear actuator 132 operably coupled to a second actuator including a pair of springs 134 stored in a spring housing 136. The closing wheel system 130 includes a pair of spring rods 138 on which the pair of springs 134 respectively travel along. The pair of spring rods 138 are mounted, at least partially, in spring housing holes 140 in the spring housing 136 such that first ends 142 of the pair of spring rods 138 are attached to the shank 118 at pivot 144. The pair of springs 134 include one or more mechanical springs. In the illustrated embodiment, the linear actuator 132 is positioned between the pair of spring rods 138 which results in a compact space saving system because each of the pair of springs 134 is adjacent the linear actuator 132 and utilizes space on the sides of the linear actuator 132 rather than in-line wherein the springs 134 are aligned with the linear actuator 132. Beneficially, this arrangement of springs 134 adjacent or in series with the linear actuator 132 utilizes simultaneously the stroke length of the actuator 132 and the length of the springs 134. Advantageously, the linear actuator 132 is electrically adjusted but the springs 134 are mechanically passive elements to absorb shock loads from ground undulations and rock strike. In other embodiments, the pair of springs 134 can be inside the linear actuator 132. In other embodiments, only a single spring is used with the linear actuator 132. In yet other embodiments, one or more springs are positioned linearly with the linear actuator 132. In yet other embodiments, the linear actuator 132 and the pair of springs 134 can be replaced with any of the herein described actuators or other actuators as commonly known by a person of ordinary skill in the art.

The closing wheel system 130 includes an end plate 150 having a pair of end plate openings 154 aligned with a pair of extensions 155 that are both sized to receive the pair of spring rods 138 therein. The end plate 150 includes an actuator opening 156 sized to receive the linear actuator 132. The end plate 150 includes one or more pin holes 160 along each of wing portions 162. Each of the one or more pin holes 160 is configured to align with corresponding holes 170 in a shank plate 158. The end plate 150 is attached to the shank plate 158 via a pair of pins 152 that are received in the pin holes 160 and holes 170 wherein the end plate 150 can be adjusted relative to the shank plate 158 by aligning the pin holes 160 to holes 170. Adjustment of the end plate 150 relative to the shank plate 158 can change the distance the pair of springs 134 can travel to thereby increase or decrease the spring stiffness and the corresponding downforce on the pair of closing wheels 122. As can be appreciated, the pair of pins 152 enable adjustment of the end plate 150 along the length of the pair of spring rods 138 to thereby compress the pair of springs 134 to increase or decrease the stiffness of the pair of springs 134 and correspondingly increase or decrease the downforce on the pair of closing wheels 122. For example, if the end plate 150 is moved closer to the spring housing 136, then the stiffness of the pair of springs 134 increases as the end plate 150 engages the pair of springs 134. Alternatively, if the end plate 150 is moved further away from the spring housing 136, then the stiffness of the pair of springs 134 decreases as the end plate 150 moves away from the pair of springs 134. The effective location of the pair of pins 152 and end plate 150 is moved away from the end of the linear actuator 132 which is beneficial for the pair of springs 134 as this arrangement increases the amount of space for which the springs 134 can travel. This arrangement is beneficial to decrease the length of actuator needed by moving the end plate 150 away from the end of the linear actuator 132 which effectively moves the end of linear actuator 132 out because the end plate 150 is moved out.

The shank plate 158 is mounted on the shank extension 121, however in other embodiments the shank plate 158 is monolithic with the shank extension 121. The shank plate 158 includes a pair of wings 172 that include the holes 170 therein.

Alternatively, or in addition to moving the end plate 150 relative to the pair of spring rods 138, the linear actuator 132 is operable to move a desired stroke length to provide an actuator force to the pair of springs 134 to compress or increase the stiffness of the pair of springs 134. The amount of actuator force that is applied by the linear actuator 132 to the pair of springs 134 varies as desired, and in one embodiment the amount of actuator force is between 100 and 1400 Newtons. The linear actuator 132 applies the actuator force to the pair of springs 134 to increase the stiffness by compressing the pair of springs 134 which corresponds to an increase in the downforce applied to the pair of closing wheels 122. The increase in the downforce applied to the pair of closing wheels 122 assists to overcome shock loading issues when the row unit 100 traverses an obstacle such that the pair of closing wheels 122 maintain contact with the ground surface while the row unit 100 traverses the obstacle. In one embodiment, the downforce of the pair of closing wheels 122 is between 200 and 800 Newtons.

Figure 3:
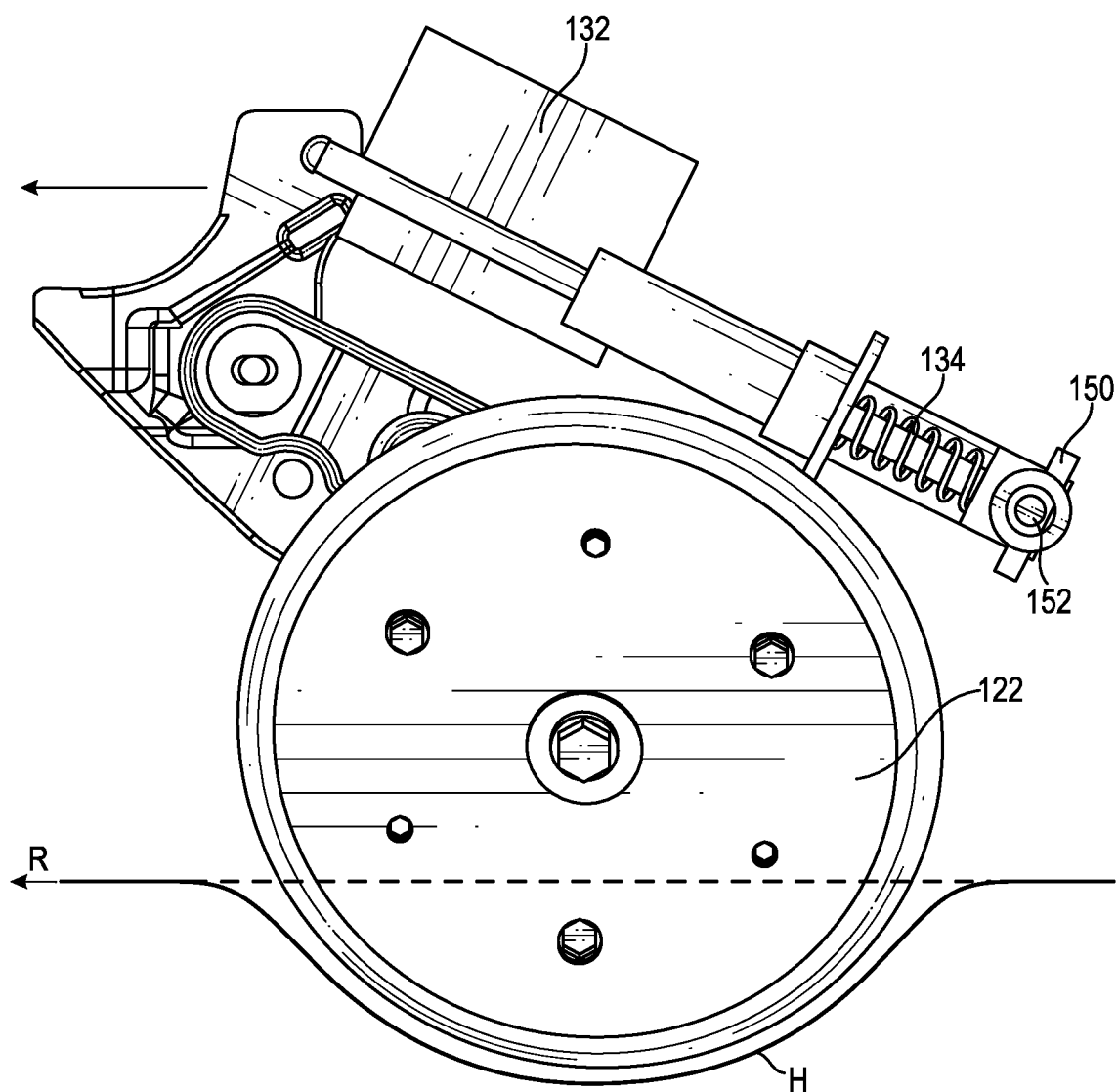
FIG. 3 is a side view of the row unit of FIG. 1 in a lowermost position.
Figure 4:
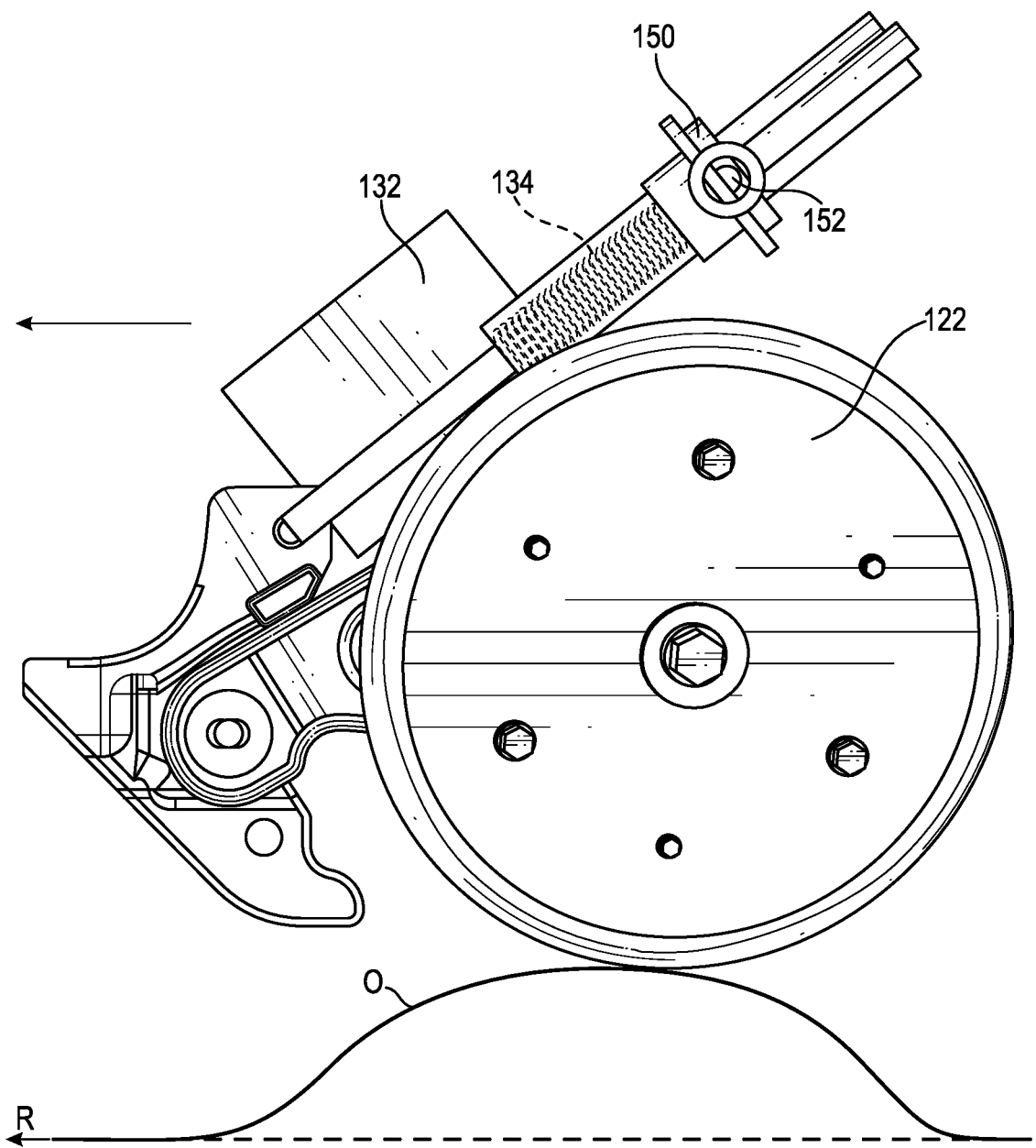
FIG. 4 is a side view of the row unit of FIG. 1 in an uppermost position.

The linear actuator 132 moves per its stroke length to compress the pair of springs 134 to change the spring force of the pair of springs 134 but the linear actuator 132 does not directly change the position of the pair of closing wheels 122. The linear actuator 132 changes the spring stiffness of the pair of springs 134 to change the downforce output of the pair of closing wheels 122. The pair of springs 134 can have a progressive spring rate or a constant spring rate, and each of the pair of springs 134 can include multiple springs wherein each of the multiple springs can have the same or different spring rate. Two extreme loading situations will be described with respect to FIGS. 3 and 4. In one embodiment illustrated in FIG. 3, the pair of closing wheels 122 will free fall from horizontal reference line "R" into a pit, hole "H", or other concave surface when the row unit 100 travels over the pit, however the actuator 132 has a 0 millimeter stroke length which results in no change in the spring stiffness of the pair of springs 134 therefore the pair of closing wheels 122 apply a minimum amount of downforce to the ground surface. The closing wheels 122 float and maintain contact with the concave surface in FIG. 3 which illustrate the lowermost position. As another example, illustrated in FIG. 4, the pair of closing wheels 122 hit an obstacle as measured relative to a horizontal reference line "R" as the row unit 100 travels over the obstacle "O", however the actuator 132 has a maximum stroke length which results in a maximum increase in the spring stiffness of the pair of springs 134 such that the pair of closing wheels 122 apply a maximum amount of downforce to the ground surface however the pair of springs 134 account for sudden impact caused by the closing wheels 122 striking the obstacle. The closing wheels 122 float and maintain contact with the obstacle in FIG. 4 which illustrate the uppermost position. As can be appreciated, the maximum down force of the closing wheels 122 occurs when the linear actuator 132 is at the end of its stroke length and the minimum down force of the closing wheels 122 occurs when the linear actuator 132 has 0 stroke length such that the linear actuator 132 has not increased the spring stiffness of the pair of springs 134. The spring stiffness of the pair of springs 134 is not increased to the maximum amount therefore the pair of springs 134 are able to withstand shock loading as the closing wheels 122 encounter obstacles, ground undulations, rocks, pits, holes, or concave surfaces.

In the illustrated embodiment, the linear actuator 132 is an electronic self-locking actuator that can adjust and maintain a certain amount of compression of the pair of springs 134 yet allows for travel of the pair of closing wheels 122 to follow the ground undulations. If the self-locking feature is engaged for the linear actuator 132 such that the linear actuator 132 is in a locked position with an extended stroke, no additional electrical power is needed to maintain the stroke length of the locked linear actuator 132. The downforce on the closing wheels 122 increases as a result of an increase in the spring stiffness of the pair of springs 134 from the actuator force of the linear actuator 132. If the linear actuator 132 is moved to a desired position to increase the spring stiffness of the pair of springs 134, the closing system 130 is still able to overcome shock loading as the pair of springs 134 absorb the shock force or load. The shock force is absorbed by the mechanical elements or pair of springs 134 so that the stroke position of the actuation device or linear actuator 132 remains unchanged during the shock event and is able to return to nominal force condition after the shock event.

The linear actuator 132 in a locked position maintains an increased spring stiffness of the pair of springs 134 that correspondingly increases the downforce of the pair of closing wheels 122 to thereby adjust and react to soil and ground undulations without applying additional electric power to the linear actuator 132. As such, the self-locking linear actuator 132 only uses electric power when actuating and electric power is not applied to the motor of the linear actuator 132 all the time, which would be a waste of power. The position of the linear actuator 132 can be changed with electric power to thereby change a nominal force setting of the pair of closing wheels 122 while providing the ability of the closing wheels 122 to float and follow ground undulations or breakaway upon rock strike. In other words, the nominal force setting of the pair of closing wheels 122 can change with electric power being applied only to the linear actuator 132.

Although the spring stiffness of the pair of springs 134 may be increased when the linear actuator 132 is engaged to increase its stroke length, the full actuator load force on the pair of springs 134 is typically not applied as the full amount of the actuator load force is often not needed. The benefit of a self-locking linear actuator 132 to hold the stroke length of the linear actuator 132 relative to the end plate 150 and thereby compress the pair of springs 134 coupled with the ability of the pair of closing wheels 122 to change position with or float along the ground undulations by rotating about pivot 119 provides mechanical shock absorbing by the pair of springs 134.

In other embodiments, the linear actuator 132 is replaced with a mechanical device such as a hydraulic cylinder, an accumulator, and/or a spring in which none of these mechanisms require electrical power. Other forms of actuators include electrohydraulic actuator, ball or screw drive, radial spring, or a leaf spring, to name a few. In these alternative embodiments, the devices may lock to hold a certain position relative to the pair of springs 134 to thereby adjust the spring stiffness of the pair of springs 134 and the corresponding downforce of the pair of closing wheels 122 that float on the ground surface.

As can be appreciated with the side by side arrangement of the linear actuator 132 and the pair of springs 134, there are advantages to a control aspect, cable routing, efficiency with electronically activated system to change the downforce of the pair of closing wheels 122. The closing wheel system 130 changes the downforce of the closing wheels 122 and the closing wheel system 130 is robust to changing ground conditions. The linear actuator 132 is fixed, and without the pair of springs 134, does not have any give or flexibility such that if the closing wheels 122 hit an immovable object, the linear actuator 132 can potentially break because the linear actuator 132 cannot withstand the shock loading. However, the linear actuator 132 coupled with the pair of springs 134 overcomes or absorbs the shock load but does not directly change the position of the closing wheels 122. The linear actuator 132 changes the spring force or K in the pair of springs 134.

The closing wheel system 130 can be connected to controllers and computerized systems to perform user entered, remote, or automatic adjustments. The automation of the closing wheel system 130 with attachment to a controller and one or more sensors can control speed, routing, adjust faster, and closed loop control (A2A) using force/stroke feedback from the linear actuator 132 which can be embedded in the linear actuator 132. The closed loop aspect can be based on feedback such as a camera processing images that show voids in soil or no voids in soil and adjust the downforce of the closing wheels 122 accordingly. Operator input can adjust the downforce to be applied by the closing wheels 122 by adjusting the linear actuator 132, alternatively in other embodiments there is an automatic adjustment of the downforce such as by utilizing ground sensing techniques. In other embodiments, the downforce can be adjusted via a prescription that enables adjustment according to certain boundaries of a field or time of year.

Figure 5:
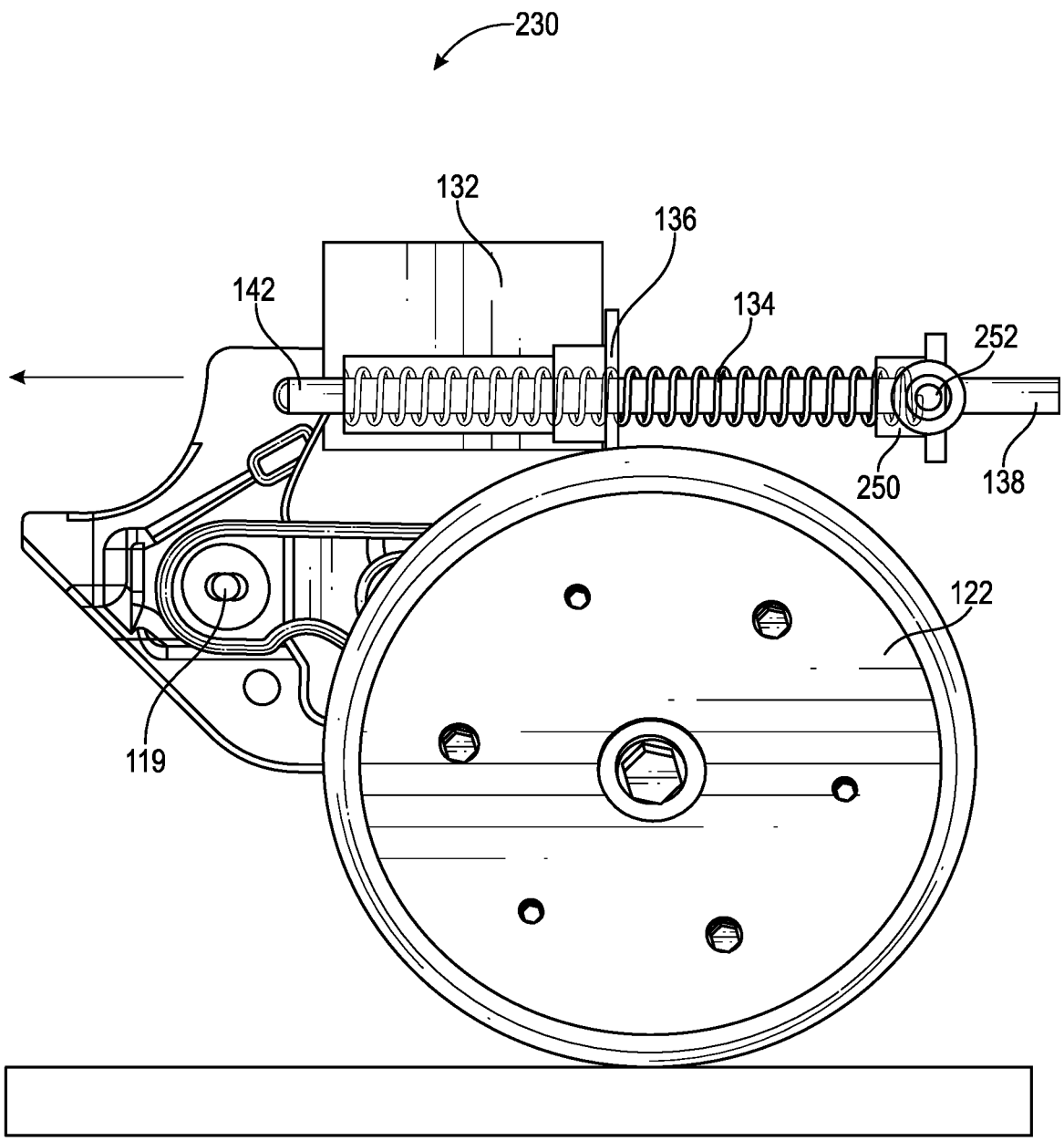
FIG. 5 is a side view of a second embodiment of a closing system for a row unit that is assembled with a work machine (not illustrated)
Figure 6:
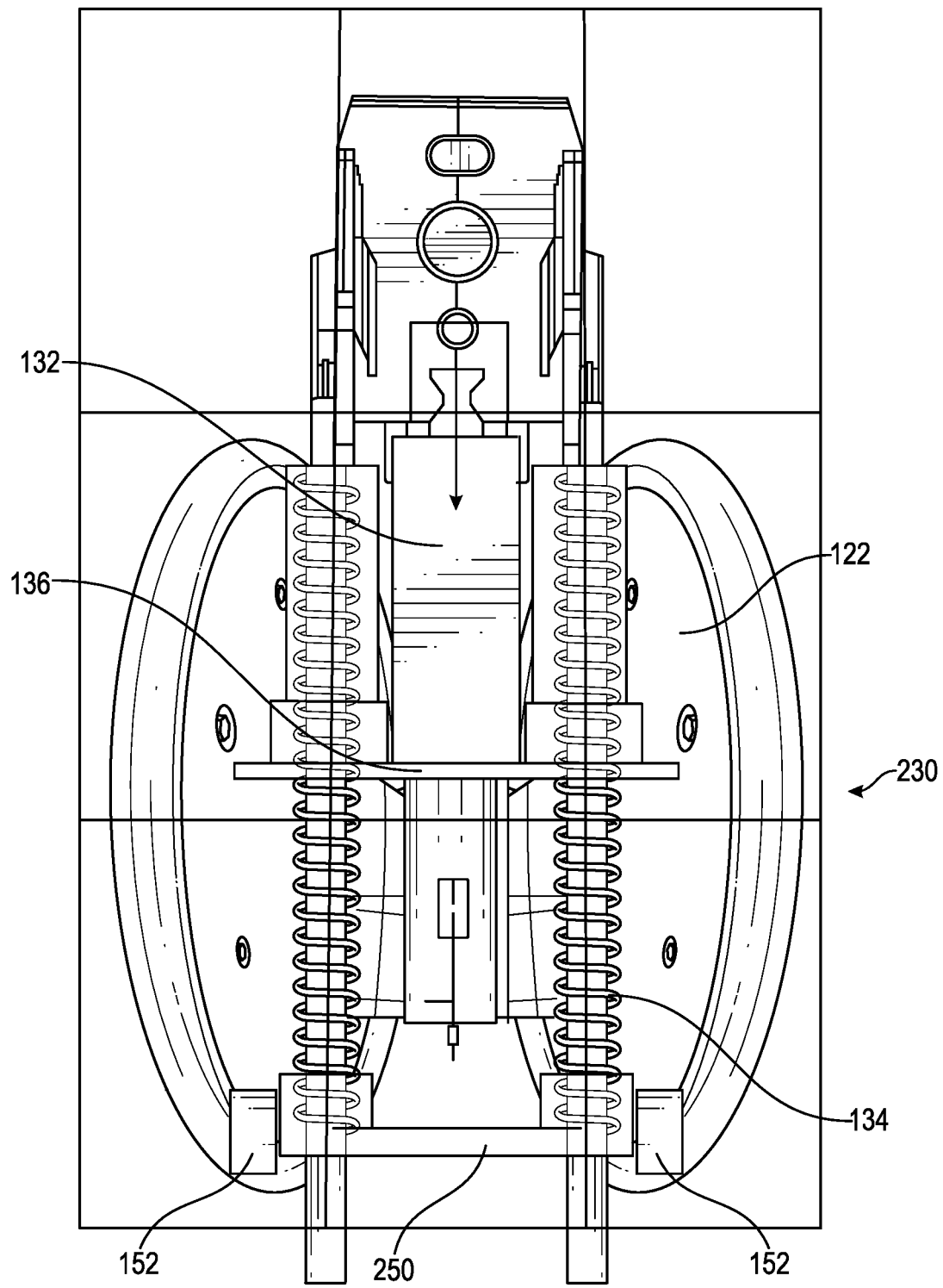
FIG. 6 is a top view of the row unit of FIG. 5.
Figure 7:
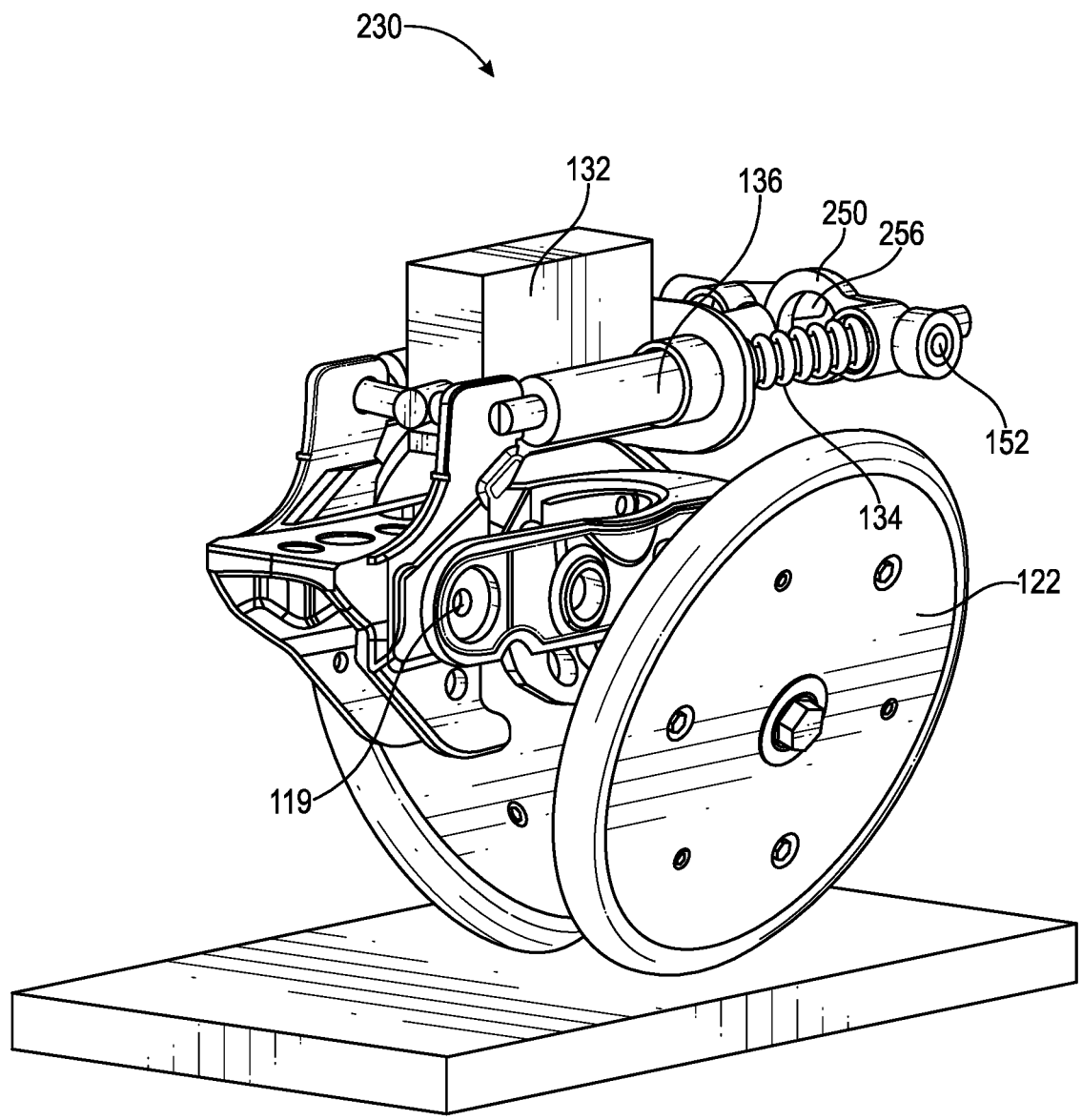
FIG. 7 is a perspective view of the row unit of FIG. 5.

A second embodiment of a closing wheel system 230 is illustrated in FIGS. 5, 6, and 7. All of the elements of the closing wheel system 230 are the same as the closing wheel system 130, however endplate 250 has a slightly different shape than endplate 150. Endplate 250 functions substantially the same way as endplate 150.

It should be appreciated that the disclosure herein is applicable to agricultural machines including drawn planters, integral planters, and any other row crop planters having row units, and is also applicable to clearing discs, tillage tines, fertilizer openers, and other systems that can benefit from a similar side-by-side arrangement of an electrically operated self-locking system, such as an actuator, to engage a mechanical system to increase a downforce output. Although illustrated in a side-by-side arrangement, it is understood that the same arrangement can be used vertically.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A closing system for a work machine, the closing system comprising:
   one or more closing devices that are operable to contact a ground surface;
   a first actuator includes a first spring and a second spring, wherein the first spring is arranged parallel to the second spring, wherein the first and second springs are configured to engage the one or more closing devices, the first and second springs are configured to apply an initial amount of force to the one or more closing devices;
   a second actuator that is disposed between the first and second springs, the second actuator is operable to engage the first and second springs to increase an amount of force that the first and second springs apply to the one or more closing devices, wherein a stroke length of the second actuator is adjustable to thereby adjust the amount of actuator force applied by the second actuator to the first and second springs, further wherein the second actuator is arranged so that adjustment of the stroke length of the second actuator does not directly alter a position of the one or more closing devices;
   an end plate configured to move relative to the first and second springs to adjust the amount of force that the first and second springs apply to the one or more closing devices;
   a shank plate having a first hole adjacent a second hole therein, wherein the shank plate is assembled with the end plate, wherein the end plate includes a first pin hole adjacent a second pin hole, wherein each of the first and second pin holes is configured to align with one of the first and second holes in the shank plate; and
   a pin received in one of the first and second pin holes in the end plate and one of the first and second holes in the shank plate to attach the end plate to the shank plate.

2. The closing system of claim 1, wherein the one or more closing devices include one or more closing wheels.

3. The closing system of claim 1, wherein the first actuator is arranged parallel to the second actuator.

4. The closing system of claim 1, wherein the second actuator is self-locking.

5. The closing system of claim 1, wherein the second actuator is a linear actuator.

6. The closing system of claim 1, further comprising:
   a pivot mechanism that is operably connected to the one or more closing devices and the work machine such that the one or more closing devices rotate about the pivot mechanism.

7. The closing system of claim 1, wherein the end plate is adjusted relative to the shank plate by aligning the first pin hole with the second hole in the shank plate to position the end plate.

8. The closing system of claim 7, wherein adjustment of the end plate relative to the shank plate changes the distance the first and second springs can travel to thereby increase or decrease a spring stiffness of the first and second springs.

9. A closing system for a work machine, the closing system comprising:
   one or more closing devices that are operable to contact a ground surface;
   one or more springs that are operable to apply an initial amount of force to the one or more closing devices;
   an actuator that is disposed adjacent the one or more springs, the actuator operable to apply an actuator force to the one or more springs to increase the amount of force that the one or more springs apply to the one or more closing devices, wherein a stroke length of the actuator is adjustable to thereby adjust the amount of actuator force applied by the actuator to the one or more springs, further wherein the actuator is arranged so that adjustment of the stroke length of the actuator does not directly alter a position of the one or more closing devices;
   an end plate configured to move relative to one or more springs to adjust the amount of force that the one or more springs apply to the one or more closing devices, the end plate includes one or more pin holes;
   a shank plate having one or more holes therein, wherein the shank plate is assembled with the end plate such that one of the pin holes aligns with one of the holes in the shank plate; and
   a pin received in the aligned pin hole and hole to attach the end plate to the shank plate.

10. The closing system of claim 9, wherein each of the one or more springs has an initial spring stiffness, wherein application of the actuator force to the one or more springs thereby increases the spring stiffness greater than the initial spring stiffness.

11. The closing system of claim 9, wherein each of the one or more springs has one of a progressive spring rate or a constant spring rate.

12. The closing system of claim 9, wherein the actuator is self-locking to maintain the actuator force on the one or more springs.

13. The closing system of claim 9, wherein the end plate includes at least one hole sized to receive the actuator therein.

14. The closing system of claim 9, further comprising:
   a pivot mechanism that is operably connected to the one or more closing devices and the work machine such that the one or more closing devices rotate about the pivot mechanism.

15. The closing system of claim 14, wherein the one or more closing devices follow a ground surface while the one or more closing devices rotate about the pivot mechanism.

16. The closing system of claim 9, wherein the actuator is a linear actuator.

17. A closing system for a work machine, the closing system comprising:
   one or more closing devices that are pivotably connected to the work machine;
   a first actuator that is operable to apply an initial amount of force to the one or more closing devices;
   a second actuator that is disposed through the first actuator, the second actuator operable to apply an actuator force to the first actuator to increase the amount of force that the first actuator applies to the one or more closing devices, wherein a stroke length of the second actuator is adjustable to thereby adjust the amount of actuator force applied by the second actuator to the first actuator, further wherein the second actuator is arranged so that adjustment of the stroke length of the second actuator does not directly alter a position of the one or more closing devices;
   an end plate configured to move relative to the first actuator to adjust the amount of force that the first actuator applies to the one or more closing devices, the end plate includes one or more pin holes;

a shank plate having one or more holes therein, wherein the shank plate is assembled with the end plate such that one of the pin holes aligns with one of the holes in the shank plate; and a pin received in the aligned pin hole and hole to attach the end plate to the shank plate.

18. The closing system of claim 17, wherein the second actuator is a linear actuator, and the first actuator is operable to absorb a shock force from the one or more closing devices traversing a ground surface.

19. The closing system of claim 17, wherein adjustment of the end plate further away from the shank plate decreases the stroke length of the second actuator to thereby increase the amount of force that the first actuator applies to the one or more closing devices.

* * * * *